June 4, 1946.  A. W. KIMBELL  2,401,427
NUT DEVICE AND INSTALLATION THEREOF
Filed Aug. 12, 1942  2 Sheets-Sheet 1

Inventor:
Arthur W. Kimbell.
By George T. Gill
Atty.

June 4, 1946.     A. W. KIMBELL     2,401,427
NUT DEVICE AND INSTALLATION THEREOF
Filed Aug. 12, 1942     2 Sheets-Sheet 2
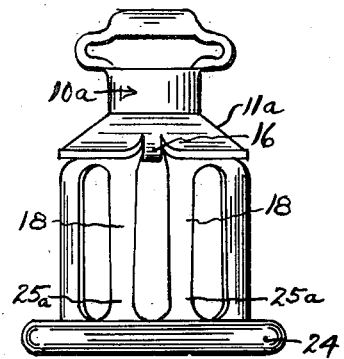
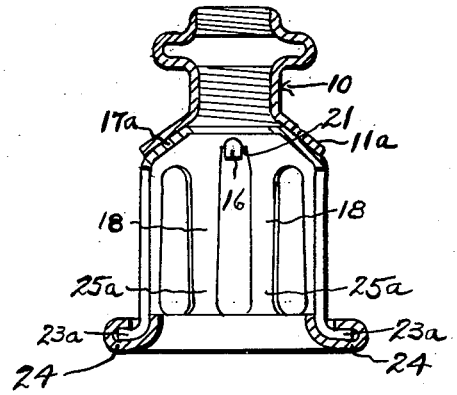
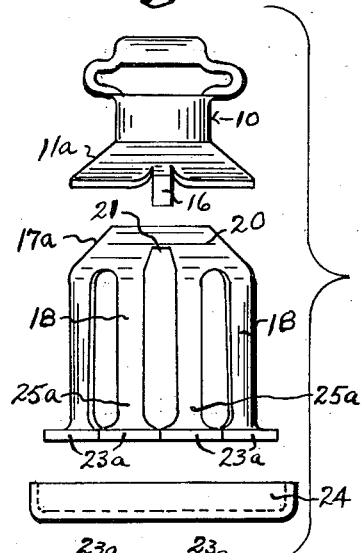
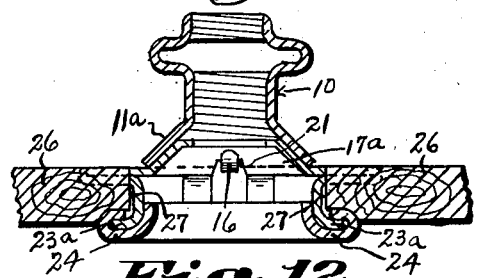
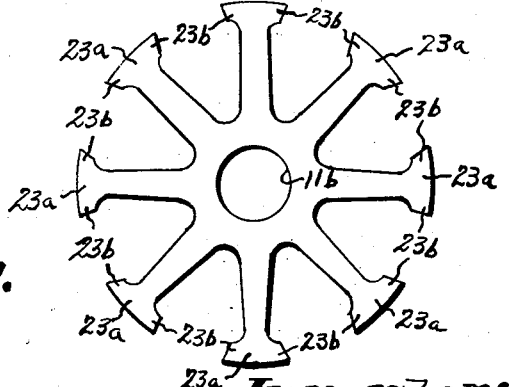
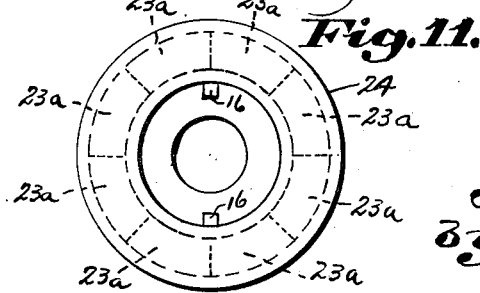
Inventor:
Arthur W. Kimbell.
By George T. Gill Att'y.

Patented June 4, 1946

2,401,427

UNITED STATES PATENT OFFICE 2,401,427

NUT DEVICE AND INSTALLATION THEREOF

Arthur W. Kimbell, West Newton, Mass., assignor, by mesne assignments, to Boots Aircraft Nut Corporation, New Canaan, Conn., a corporation of Delaware Application August 12, 1942, Serial No. 454,557

2 Claims. (Cl. 85—40)

1

The present invention relates to nut installations, particularly to those of the type wherein one or more nut members are affixed to an apertured support prior to engagement by a cooperative fastening element as, for example, a bolt, and the invention aims generally to improve existing installations of that type.

A further and more specific aim and object of the invention is the provision of an improved nut installation for blind fastenings applied to apertured wood or plastic supports; for example, parts of aircraft, automotive, or like bodies. Accordingly, the invention provides a simple nut member, preferably of sheet metal, combined with a case designed to be clinched permanently into the support in spider-leg fashion and which can be applied from one accessible side of the support. Such an installation, according to the invention, will withstand the torque applied to it when the bolt or screw is applied by modern production methods without tearing the cage or nut from the support.

Illustrative of the invention, reference is made to the accompanying drawings, showing preferred embodiments of the invention, and wherein.

Figure 1:
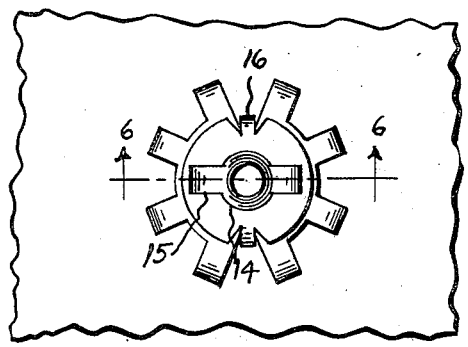
Fig. 1 is an enlarged top plan view of the installation or nut assembly.
Figure 2:
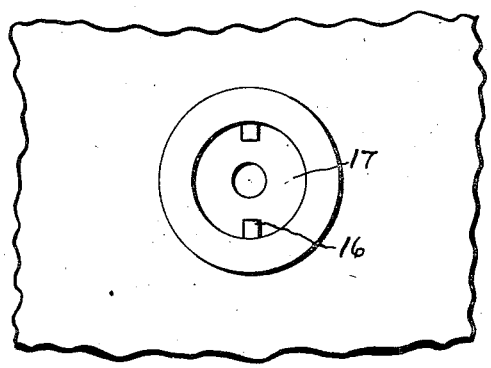
Fig. 2 is a bottom plan view thereof.
Figure 3:
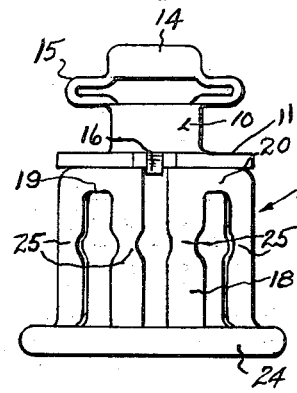
Fig. 3 is an enlarged side elevation of the combined nut and cage members.
Figure 4:
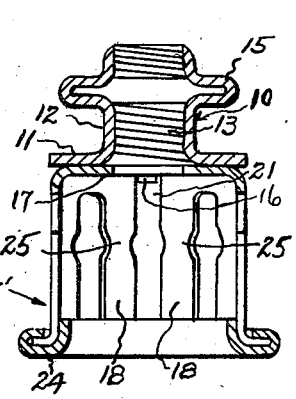
Fig. 4 is a vertical sectional view thereof.
Figure 5:
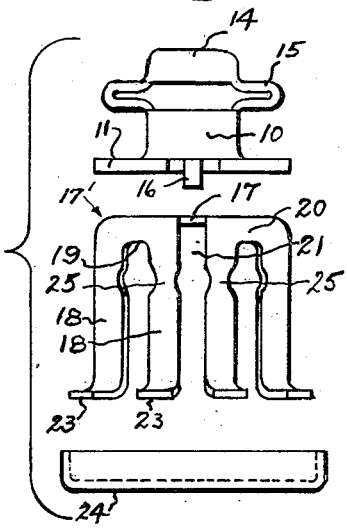
Fig. 5 is a side view similar to Fig. 3 with the component parts disassembled.
Figure 6:
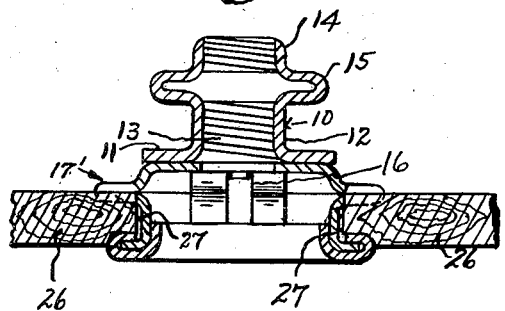
Fig. 6 is a vertical sectional view taken on the line 6—6 of Fig. 1.

Figs. 7, 8, and 9 are views similar to Figs. 3, 4, and 5 respectively of a second form of the invention;

Fig. 10 is a sectional view similar to Fig. 6 illustrating the second form applied to the support;

Fig. 11 is a bottom plan view of the nut assembly, part of the container ring being broken away to show the arrangement of cage feet; and Fig. 12 is a plan view of the blank used for making the cage according to the form shown in Figs. 7 to 10 inclusive.

The invention, in its broader features, comprises the provision of an axially collapsible cage or attaching portion, having a suitable nut member attached to one end thereof, and which may be inserted in an opening in a supporting member from one accessible side thereof, for blind fastenings, and readily collapsed thereon with

2 portions of the cage radially clenched to or embedded in the support in spider-like fashion, to securely mount the nut in fixed relation to the support. The installation is particularly useful in connection with blind fastening installations on plywood and the like bodies as, for example, plywood parts of aircraft, accessible from only one side thereof, and the nut as well as the part to be supported with its attaching bolt must be applied from said accessible side. The device is made up of an assembly of pieces to facilitate manufacture.

In the illustrated forms of the invention shown in the drawings the nut member 10 may be of any suitable form and construction. However, as herein illustrated, the nut is formed of sheet metal and is provided with an annular base 11 and a central tubular nut barrel 12 which may be internally threaded as at 13. If a self-locking nut is desired, the nut may be formed with an axially spaced threaded portion 14 connected to the barrel 12 by folded resilient wings 15. It will be understood, however, that this locking feature is optional. Preferably, the base 11 is formed with a plurality of annularly spaced peripheral lugs 16 for securing the nut member to the attaching cage.

The attaching portion on the cage 17' is preferably formed as a part separate from the nut, and is of sheet metal provided with an apertured head 17, the aperture of which is at least equal to the diameter of the threaded bore 13 of the nut so as to permit passage of the screw therethrough.

The sides of the cage comprise a plurality of relatively narrow collapsible fingers or ribbons 18 integral with the head 17 and joined thereto at points below the upper plane of the head 17 so as to form a relatively stiff and rigid crown 20. Certain of the ribbons 18 have edges extending outwardly to the plane of outer face of the head so as to form intervening spaces 21 for the reception of the fastening means 16, such as the tongue 16 on the nut base 11. The nut 10 may, however, be attached to the cage head 17 by other suitable means as, for example, by welding it directly thereto.

The lower ends of the fingers or ribbons 18 forming the sides of the cage are outturned to provide foot portions 23, which are embraced by a retainer ring or band 24, overlying the upper and lower faces of the feet 23 and extending upwardly along the inner wall of the cage a substantial distance so as to reinforce the latter. The feet 23 are thus securely clamped by the band 24 against displacement vertically in opposite directions, as well as radially outwardly and inwardly during the attaching operation.

The fingers or ribbons 18 are preferably formed with weakened areas 25 intermediate the feet and crown, so that as the cage is subjected to axial collapsing pressure, all of the fingers will fold at a predetermined plane, insuring accurate positioning of the nut in proper position with its axis normal to the support. In the form illustrated in Figs. 1 to 6 inclusive, the weakened areas 25 are located nearer the crown 20 than the ring 24.

The nut and cage assembly thus described may be readily assembled upon a supporting panel 26 of suitable material, such as wood or plastic as desired, which previously has been formed with an aperture 27 of sufficient size to permit the passage of the nut 10 and crown 20 of the cage therethrough. As illustrated in Fig. 6, the feet 23 and retainer band 24 are of larger diameter than the aperture 27 to provide a clamping surface for engaging the accessible side of the support 26.

The assembled nut and cage head is inserted through the aperture 27 from the accessible side of the panel and clamping pressure is applied in any suitable manner between the nut 10 and outer flange of the ring 24 to collapse the fingers 18. The application of clamping pressure causes the fingers 18 to buckle outwardly at the weakened areas 25, permitting the collapsed fingers to be flattened against the opposite face of the support 26. When the supporting member 26 is of relatively soft material, such as plywood and the like, portions of the fingers 18 as well as the ring 24 are actually embedded in the support, thus securely fixing the nut axially with reference to the aperture 27 of the supporting panel and located on the side thereof opposite the side from which the nut is inserted.

The collapsing of the fingers or ribbons 18 to spider-like form and partially imbedding them in the support provides a strong secure nut installation to resist the torque transmitted to the nut and cage in applying a screw or bolt by modern production methods as, for example, a power-driven rotary tool.

In Figs. 7 to 12 I have shown a second form of the invention specially adapted to installations subject to high torque in applying the cooperating fastening element.

The nut assembly of Figs. 7 to 12 inclusive is very similar to the construction illustrated in Figs. 1 to 6 inclusive, except that the base 11a of the nut and the head 17a of the cage are conical in shape to provide a more stable and centered assembly. Furthermore, the outwardly turned feet 23a are formed with lateral extensions 23b so that when the feet are clamped in the retainer ring 24 the portions 23b abut each other and provide a continuous rim of the cage, as shown in Fig. 11.

Advantageously, the weakened areas 25a of the fingers 18 are located nearer the feet 23a than to the head 17a so that the collapsing of the fingers is immediately above the inner upper edge of the ring 24 so that the spider-like collapsed fingers are almost wholly embedded in the support 26.

The cage member may conveniently be made from a stamped blank, as shown in Fig. 12, which may be apertured as indicated by the line 11b and, thereafter, shaped to the form shown in Fig. 9.

It will be appreciated by those skilled in the art that the invention provides a simple, economical, neat installation for blind fastenings, particularly adapted for plywood and like supports.

Although I have illustrated and described preferred embodiments of my invention, I do not wish to be limited thereby because the scope of my invention is best defined by the following claims.

I claim:

1. A nut assembly comprising a nut member having a base and a tubular threaded portion, an attaching member assembled with said nut base and including a stiff, rigid crown abutting against the nut base, tongues extending from one of said members and engaging the other to secure the nut member to the attaching member, and spaced, bendable, finger-like portions extending from the crown of the attaching member and having outturned free end portions.

2. A nut assembly comprising a nut member having a frustro-conical base and a tubular threaded nut portion, an attaching member assembled with said nut base including a frustro-conical end portion engaging with and secured to the frustro-conical base of the nut member, and a skirt of spaced, bendable, fingers extending from the frustro-conical end portion of the attaching member, said fingers having outturned, free end portions.

ARTHUR W. KIMBELL.